(12) United States Patent
Jung et al.

(10) Patent No.: US 8,264,638 B2
(45) Date of Patent: Sep. 11, 2012

(54) LIQUID CRYSTAL DISPLAY AND METHOD OF MANUFACTURING THE SAME

(75) Inventors: Won-Cheol Jung, Seoul (KR); Byung-Ki Kim, Gunpo-si (KR); Seoung-Jae Im, Seoul (KR)

(73) Assignee: Samsung Electronics Co., Ltd. (KR)

( * ) Notice: Subject to any disclaimer, the term of this patent is extended or adjusted under 35 U.S.C. 154(b) by 395 days.

(21) Appl. No.: 12/483,352

(22) Filed: Jun. 12, 2009

(65) Prior Publication Data

US 2010/0201909 A1 Aug. 12, 2010

(30) Foreign Application Priority Data

Feb. 6, 2009 (KR) .................. 10-2009-0009918

(51) Int. Cl.
*G02F 1/1335* (2006.01)
*G02F 1/1333* (2006.01)
(52) U.S. Cl. .......................... 349/69; 349/87
(58) Field of Classification Search .................. 349/69, 349/87
See application file for complete search history.

(56) References Cited

U.S. PATENT DOCUMENTS

| | | | | |
|---|---|---|---|---|
| 7,649,594 | B2* | 1/2010 | Kim et al. | 349/71 |
| 7,994,697 | B2* | 8/2011 | Park | 313/495 |
| 8,035,590 | B2* | 10/2011 | Kakinuma et al. | 345/88 |
| 2004/0263039 | A1* | 12/2004 | Takei et al. | 313/110 |
| 2007/0007881 | A1* | 1/2007 | Kim et al. | 313/501 |
| 2008/0111460 | A1* | 5/2008 | Kang et al. | 313/292 |
| 2008/0158480 | A1* | 7/2008 | Ii et al. | 349/71 |
| 2008/0252824 | A1* | 10/2008 | Kadowaki et al. | 349/96 |
| 2008/0265770 | A1* | 10/2008 | Seon et al. | 313/556 |
| 2008/0291364 | A1* | 11/2008 | Moon et al. | 349/64 |
| 2008/0309216 | A1* | 12/2008 | Park et al. | 313/496 |
| 2009/0001871 | A1* | 1/2009 | Song | 313/503 |
| 2009/0066217 | A1* | 3/2009 | Park | 313/496 |
| 2009/0066881 | A1* | 3/2009 | Park | 349/69 |
| 2009/0115713 | A1* | 5/2009 | Kakinuma et al. | 345/88 |
| 2009/0115714 | A1* | 5/2009 | Jeong et al. | 345/88 |

(Continued)

FOREIGN PATENT DOCUMENTS

JP 08036175 A 2/1996

(Continued)

OTHER PUBLICATIONS

Fabrication of a 50 nm half-pitch wire grid polarizer using nanoimprint lithography; Seh-Won Ahn, Ki-Dong Lee, Jin-Sung Kim, Snag Hoon Kim, Joo-Do Park, Sarng-Hoon Lee and Phil-Won Yoon; Institute of Physics Publishing; Nanotechnology 16 (2005) 1874-1877; doi:10.1088/0957-4484/16/9/076.

(Continued)

*Primary Examiner* — K. Cyrus Kianni
(74) *Attorney, Agent, or Firm* — Cantor Colburn LLP

(57) ABSTRACT

Disclosed is a liquid crystal display which includes a first display panel including a plurality of pixel electrodes, a second display panel facing the first display panel, and a liquid crystal layer interposed between the first display panel and the second display panel, and a method of manufacturing the liquid crystal display panel. The second display panel includes a light emitting element displaying a color, an insulating layer disposed on the light emitting element and including a rubbed surface, a polarization layer disposed on the insulating layer and opposite to the light emitting element with respect to the insulating layer, and a common electrode disposed on the polarization layer and facing the pixel electrode.

8 Claims, 9 Drawing Sheets

U.S. PATENT DOCUMENTS

| | | | | |
|---|---|---|---|---|
| 2009/0141480 A1* | 6/2009 | Kim et al. | .................... | 362/97.1 |
| 2009/0160744 A1* | 6/2009 | Kim et al. | ........................ | 345/84 |
| 2009/0175027 A1* | 7/2009 | Jung et al. | .................... | 362/97.2 |
| 2010/0085727 A1* | 4/2010 | Igarashi et al. | ................. | 362/84 |
| 2010/0201909 A1* | 8/2010 | Jung et al. | ........................ | 349/61 |

FOREIGN PATENT DOCUMENTS

| | | |
|---|---|---|
| JP | 11052371 A | 2/1999 |
| JP | 11237632 A | 8/1999 |
| JP | 2004094039 A | 3/2004 |
| JP | 2005274674 A | 10/2005 |
| KR | 9527429 A | 10/1995 |
| KR | 100283568 B1 | 12/2000 |
| KR | 1020060112157 A | 10/2006 |
| KR | 1020080032313 A | 4/2008 |
| WO | 9908140 A1 | 2/1999 |

OTHER PUBLICATIONS

Nanowire grid polarizer for energy efficient and wide-view liquid crystal displays; Applied Physics Letters 93, 121104 (2008); Zhibing Ge and Shin-Tson Wu; 93, 121104-1 [DOI: 10.1063/1.2988267].

Highly Aligned a-Type Copper Phthalocyanine Formed on Rubbed Polyimide Alighment Layer; Takaaki Manaka, Kohei Taguchi, Ken Ishikawa and Hideo Takezoe; Mpn. J. Appl. Phys. vol. 39 (2000) pp. 4910-4911.

Study of Effect of Seam on Wire-Grid Polarizer Efficiency Using Rigorous Coupled-Wave Analysis; An-Chi Wei, Han-Ping D. Shieh, and Jyh-Rou Sze; Japanese Journal of Applied Physics; ol. 46, No. 8A, 2007, pp. 5379-5382.

\* cited by examiner

LIQUID CRYSTAL DISPLAY AND METHOD OF MANUFACTURING THE SAME

CROSS-REFERENCE TO RELATED APPLICATION

This application claims priority to Korean Patent Application No. 10-2009-0009918 filed on Feb. 6, 2009, and all the benefits accruing therefrom under 35 U.S.C. §119, the entire contents of which are incorporated herein by reference.

BACKGROUND

1. Field

This disclosure relates to a liquid crystal display ("LCD") and a method of manufacturing the same.

2. Description of the Related Art

A liquid crystal display is a flat panel display which is being widely used. The liquid crystal display includes two display panels provided with field generating electrodes and a liquid crystal layer interposed therebetween. Liquid crystal molecules in the liquid crystal layer are rotated depending upon an electric field formed between the field generating electrodes to thereby vary light transmittance to display images.

The liquid crystal display includes a polarizer attached to the outside of the display panel. The polarizer selectively transmits light vibrating in a predetermined direction but absorbs or reflects other light, so the polarizer controls the direction of incident light on the display panel or light emitted from the display panel.

However, the polarizer attached to the outside of display panel has a considerable thickness, so the polarizer may partially refract incident light on the display panel or light emitted from the display panel.

SUMMARY

Exemplary embodiments of a liquid crystal display capable of improving the display characteristic by decreasing light refraction, and a method of manufacturing the same will be described.

One aspect of the present invention provides a liquid crystal display including a first display panel including a plurality of pixel electrodes, a second display panel facing the first display panel, and a liquid crystal layer interposed between the first display panel and the second display panel. The second display panel includes a light emitting element displaying a color, an insulating layer disposed on the light emitting element and including a rubbed surface, a polarization layer disposed on the insulating layer, and a common electrode disposed on the polarization layer and facing the pixel electrode. The polarization layer is disposed opposite to the light emitting element with respect to the insulating layer.

The polarization layer may include a dichroic dye absorbing light of a visible ray region.

The rubbed insulating layer may include a plurality of grooves, and the grooves may be filled with the dichroic dye.

The polarization layer may have a thickness of about 0.05 micrometer (μm) to about 1 micrometer (μm).

The light emitting element may include at least one of a phosphor and a quantum dot.

The liquid crystal display may further include a light emitting diode supplying light to the light emitting element.

The light emitting element may emit light having a longer wavelength than a wavelength of light supplied from the light emitting diode.

The light emitting diode may emit blue light, and the light emitting element may emit at least one of red light and green light.

Another aspect of the present invention provides a method of manufacturing a liquid crystal display including forming a light emitting element on a substrate, forming an insulating layer on the substrate and the light emitting element, rubbing the surface of the insulating layer, forming a polarization layer on the rubbed insulating layer, and forming a common electrode on the polarization layer. The polarization layer is disposed opposite to the light emitting element with respect to the insulating layer.

The forming an insulating layer may include coating at least one of a polyimide precursor solution and a polyamide acid solution, and subjecting the coated solution to a heat treatment.

The forming a polarization layer may include coating a dichroic dye containing solution.

The forming a light emitting element may include at least one of inkjet printing, screen printing, and imprinting of a phosphor or a quantum dot.

A further aspect of the present invention provides a liquid crystal display including a first display panel including a plurality of pixel electrodes, a second display panel facing the first display panel, and a liquid crystal layer interposed between the first display panel and the second display panel. The second display panel includes a light emitting element displaying a color, a wire grid polarizer disposed on the light emitting element, and a common electrode disposed on the wire grid polarizer. The wire grid polarizer is disposed between the light emitting element and the common electrode.

The light emitting element may include at least one of a phosphor and a quantum dot.

The liquid crystal display may further include a light emitting diode supplying light to the light emitting element, and the light emitting element may emit light having a longer wavelength than a wavelength of light supplied from the light emitting diode.

The light emitting diode may emit blue light, and the light emitting element may emit at least one of red light and green light.

DETAILED DESCRIPTION

Figure 1:
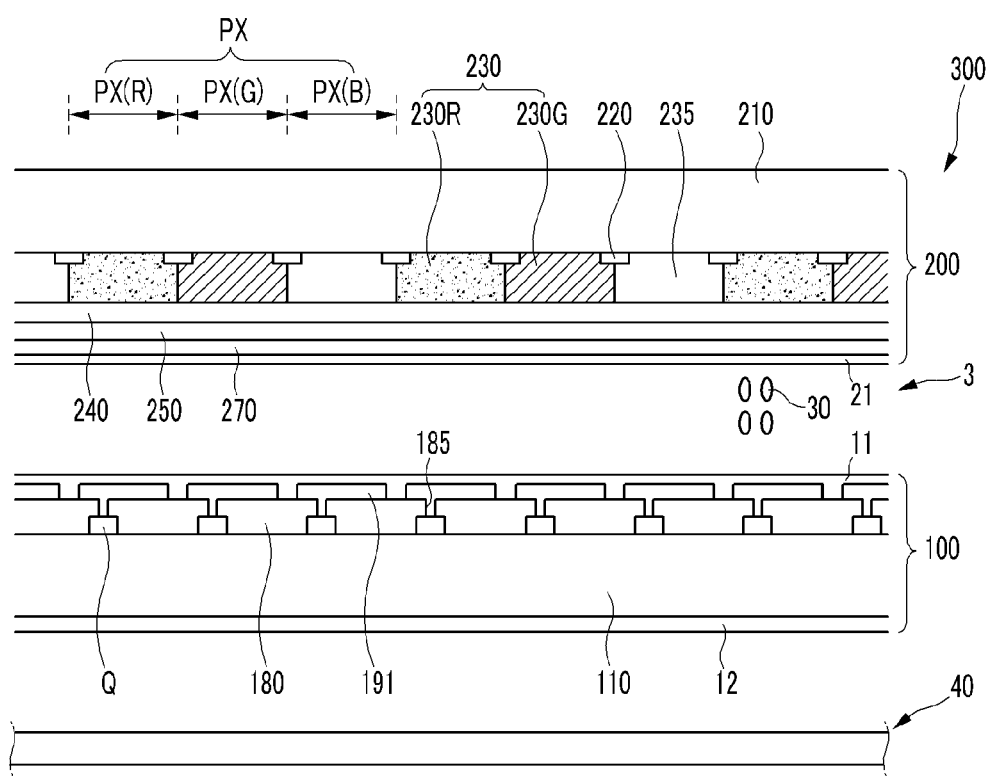
FIG. 1 is a cross-sectional view showing a liquid crystal display according to an embodiment of the present invention.

Exemplary embodiments of the present invention will be described more fully hereinafter with reference to the accompanying drawings. The present invention may, however, be embodied in many different forms and should not be construed as limited to the exemplary embodiments set forth herein.

In the drawings, the thickness of layers, films, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the terms "a" and "an" are open terms that may be used in conjunction with singular items or with plural items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, a liquid crystal display according to an embodiment of the present invention is described in detail referring to FIG. 1.

FIG. 1 is a cross-sectional view showing a liquid crystal display according to an embodiment of the present invention.

The liquid crystal display includes liquid crystal display panel 300. The liquid crystal display panel 300 includes a thin film transistor display panel 100 and a common electrode display panel 200 disposed to face each other, and a liquid crystal layer 3 interposed between the thin film transistor and common electrode display panels 100 and 200.

The liquid crystal display also includes a light source 40 disposed on one surface of liquid crystal display panel 300, and generating and supplying light to the liquid crystal display panel 300. In the illustrated embodiment, the light source 40 includes a plurality of point light sources, such as light emitting diodes ("LEDs"), and the light emitting diodes may emit light of a visible ray region.

The liquid crystal display panel 300 includes a plurality of gate lines (not shown) transmitting gate signals and a plurality of data lines (not shown) transmitting data signals which are disposed to cross each other, and a plurality of pixels PX arranged in a form of a matrix in a region of the liquid crystal display panel 300 defined by the gate lines and the data lines. FIG. 1 schematically shows a plurality of pixels PX.

First, the thin film transistor display panel 100 will be described.

A plurality of thin film transistors Q is disposed on an insulating substrate 110. Each thin film transistor Q includes a gate electrode (not shown) connected to a gate line, a semiconductor (not shown) overlapped with the gate electrode, a gate insulating layer (not shown) disposed between the gate electrode and the semiconductor, a source electrode (not shown) connected to a data line, and a drain electrode (not shown) facing the source electrode with the semiconductor therebetween. FIG. 1 shows an exemplary structure of the liquid crystal display including a thin film transistor Q in each pixel PX, but the embodiment is not limited thereto and may include two or more thin film transistors.

A protective layer 180 is disposed on the thin film transistor Q, and the protective layer 180 includes a contact hole 185 exposing the thin film transistor Q.

A pixel electrode 191 is disposed on the protective layer 180. The pixel electrode 191 is electrically connected to the thin film transistor Q through the contact hole 185.

An alignment layer 11 is disposed on a first surface of thin film transistor display panel 100, and a polarizer 12 is disposed on a second surface of the thin film transistor display panel 100 opposing the first surface with respect to the insulating substrate 110. The alignment layer 11 and the polarizer 12 respectively define the uppermost and lowermost element of the thin film transistor display panel 100, as illustrated in FIG. 1.

Hereinafter, the common electrode display panel 200 will be described.

A light blocking member 220, also referred to as a black matrix, is disposed on an insulating substrate 210. The light blocking member 220 restricts a passage of light to effectively block light from leaking between the pixel electrodes 191.

A plurality of light emitting elements 230 is also disposed on the insulating substrate 210. The light emitting elements 230 are disposed in regions surrounded by the light blocking members 220, and display one primary color, such as red, green, or blue.

The light emitting element 230 includes a photoluminescent material which is stimulated by light to emit light solely by the light stimulation. The light emitting element 230 may emit light having an intrinsic wavelength by using light supplied from a light emitting diode of the light source 40. In this case, the light emitting element 230 emits light having a wavelength which is the same as or longer than that of light supplied from the light emitting diode of the light source 40. In one exemplary embodiment, when the light source 40 includes a blue light emitting diode, the light emitting element 230 may emit blue light of a similar wavelength region, or the light emitting element 230 may emit red light or green light of a longer wavelength than that of blue light and not blue light.

As shown in FIG. 1, a red pixel PX(R) includes a red light emitting element 230R emitting red light by receiving a stimulating light, and a green pixel PX(G) includes a green light emitting element 230G emitting green light by receiving a stimulating light. The blue pixel PX(B) may display a blue color just by transmitting light supplied from the blue light emitting diode through the liquid crystal display panel 300 without including an additional light emitting element. As illustrated in FIG. 1, the blue pixel PX(B) may include a transparent insulator 235 instead of a light emitting element, to compensate for a height difference with respect to other pixels and form a substantially coplanar lower surface of the plurality of light emitting elements 230. However, the embodiment is not limited thereto, and the blue pixel PX(B) may also include a blue light emitting element, or the blue pixel may not include the transparent insulator 235 and be empty.

The light emitting element 230 may include at least one of a phosphor and a quantum dot. The red light emitting element 230R may include a red phosphor, and for example, the red light emitting element 230R may include at least one selected from the group consisting of $Y_2O_2S$:Eu, $YVO_4$:Eu,Bi, $Y_2O_2S$:Eu,Bi, SrS:Eu, (Ca,Sr)S:Eu, $SrY_2S_4$:Eu, $CaLa_2S_4$:Ce, $(Sr,Ca,Ba)_3SiO_5$:Eu, $(Sr,Ca,Ba)_2Si_5N_8$:Eu, and $(Ca,Sr)_2AlSiN_3$:Eu. The green light emitting element 230G may include a green phosphor, and for example, the green light emitting element 230Gt may include at least one selected from the group consisting of $YBO_3$:Ce,Tb, $BaMgAl_{10}O_{17}$:Eu,Mn, (Sr,Ca,Ba) $(Al,Ga)_2S_4$:Eu, ZnS:Cu,Al, $Ca_8Mg$, $SiO_{44}Cl_2$:Eu,Mn, $Ba_2SiO_4$:Eu, $(Ba,Sr)_2SiO_4$:Eu, $Ba_2(Mg,Zn)Si_2O_7$:Eu, $(Ba,Sr)Al_2O_4$:Eu, $Sr_2Si_3O_8.2SrCl_2$:Eu, $(Sr,Ca,Ba,Mg)P_2O_7N_8$:Eu,Mn, $(Sr,Ca,Ba,Mg)_3P_2O_8$:Eu,Mn, $Ca_3Sc_2Si_3O_{12}$:Ce, $CaSc_2O_4$:Ce, b-SiAlON:Eu, $Ln_2Si_3O_3N_4$:Tb, and $(Sr,Ca,Ba)Si_2O_2N_2$:Eu. The phosphor may have a size of about 100 to about 3000 nanometers (nm).

The quantum dot may include, for example, at least one selected from the group consisting of a compound of Group 2 and Group 6 elements such as CdSe and CdS and their derivatives, a compound of Group 3 and Group 5 elements such as InP and their derivatives, and a compound of Group 3 and Group 6 elements such as InS and their derivatives.

On the light emitting element 230, an insulating layer 240 and a polarization layer 250 are sequentially disposed.

Figure 2:
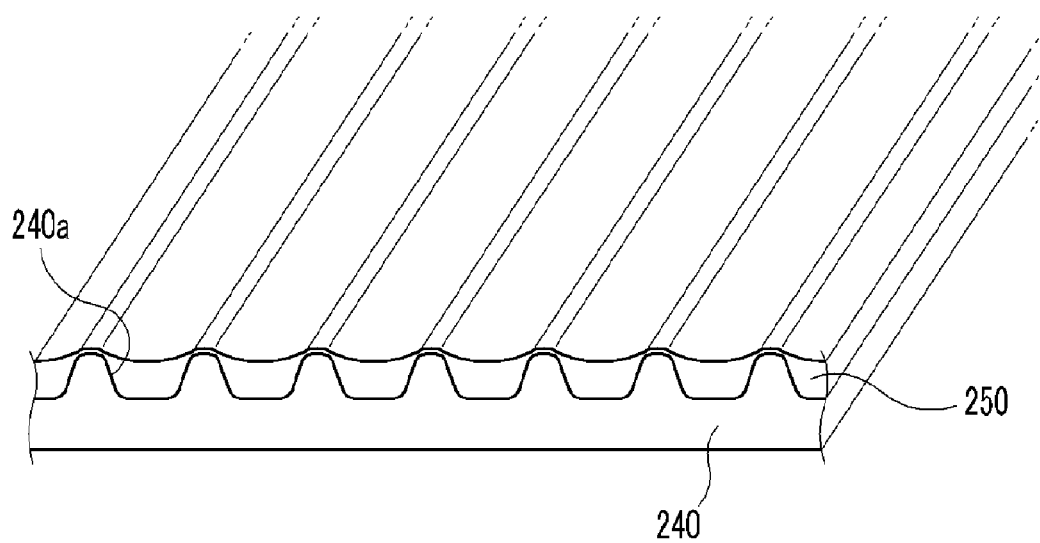
FIG. 2 is a schematic view showing an exemplary embodiment of insulating layer and a polarization layer provided in the liquid crystal display shown in FIG. 1.

FIG. 2 is a schematic view showing an exemplary embodiment of an insulating layer and a polarization layer of the liquid crystal display shown in FIG. 1.

As shown in FIG. 2, the insulating layer 240 includes a rubbed surface and includes a plurality of grooves 240a each elongated in a first direction. The plurality of grooves 240a are arranged in a second direction inclined with respect to the first direction, such as perpendicular to the first direction. In an exemplary embodiment, the insulating layer 240 may include polyimide, for example, and may have a thickness of about 0.05 to about 1 micrometer (µm).

A polarization layer 250 is disposed on an upper surface the insulating layer 240. The upper surface of the insulating layer 240 includes areas defined by the grooves 240a. The polarization layer 250 is disposed along the rubbed surface of insulating layer 240 and effectively completely fills or occupies each of the grooves 240a of the insulating layer 240.

The polarization layer 250 includes a dichroic dye, and the dichroic dye has a directionality along the groove 240a disposed in the insulating layer 240. The dichroic dye strongly absorbs or reflects a certain directionally polarized component among light which has passed through the liquid crystal layer 3 (shown in FIG. 1) depending upon the directionality, and selectively transmits only a polarized component perpendicular to the axis, so that images are displayed by the liquid crystal display.

The dichroic dye may include any material as long as the material can strongly absorb a certain directionally polarized component. In an exemplary embodiment, the dichroic dye may include at least one material selected from the group consisting of Blue AB2 637 nm, Blue AB3 643 nm, Blue AB4 641 nm, Orange AO1 517 nm, Orange AZO1 487 nm, Yellow AG1 463 nm, Red AR1 554 nm, Cyan AC1 668 nm (manufactured by Nematel Co. Ltd.), and copper phthalocyanine ("CuPc").

Thereby, as the polarization layer 250 including the dichroic dye is disposed inside of the liquid crystal display panel 300 to as to not be an outermost member of the liquid crystal display panel 300, the polarization layer 250 reduces or effectively prevents the light degeneration or the image distortion which is caused by refracting light emitted from the light emitting element due to a polarizer attached outside of liquid crystal display panel. Accordingly, it is possible to improve the display characteristics of the liquid crystal display.

In addition, the polarization layer 250 including the dichroic dye disposed inside of liquid crystal display panel 300 is a thin layer having a thickness of about 1 µm or less, so it is possible to decrease an overall thickness of the liquid crystal display.

The polarization direction of the polarization layer 250 is determined along with the rubbing direction of the insulating layer 240, so it is possible to provide a desirable polarization direction by controlling the rubbing direction. Thereby, it is possible to reduce or effectively prevent a phenomenon of a narrowing of the viewing angle the light leakage due to the polarization axis shift, and an additional phase difference film is not required for compensating this phenomenon. Thereby, the manufacturing cost may be reduced.

Referring again to FIG. 1, a common electrode 270 including a transparent conductive material, such as ITO or IZO, is disposed on the polarization layer 250, and an alignment layer 21 is disposed on the common electrode 270. In the illustrated embodiment, the substrate 210 and the alignment layer 21 respectively define the uppermost and lowermost element of the common electrode display panel 200, as illustrated in FIG. 1. Since the polarizing layer 250 is disposed within the common electrode display panel 200, and is not disposed on an outer surface of the common electrode display panel 200 to form an outermost member of the display panel, the overall thickness of the liquid crystal display is reduced.

The liquid crystal layer 3 including a plurality of liquid crystal molecules 30 is disposed between the thin film transistor display panel 100 and the common electrode display panel 200. When the liquid crystal molecules 30 have positive dielectric anisotropy, major axes of the liquid crystal molecules 30 are aligned in a direction substantially parallel to the surface of the two display panels 100 and 200 in a state when no electric field is applied.

Hereinafter, an exemplary embodiment of a method of manufacturing the common electrode display panel 200 of liquid crystal display is described with reference to FIGS. 3 to 6, and FIG. 2.

FIGS. 3 to 6 are cross-sectional views sequentially showing the exemplary embodiment of the method of manufacturing the common electrode display panel 200 of liquid crystal display shown in FIG. 1.

Figure 3:
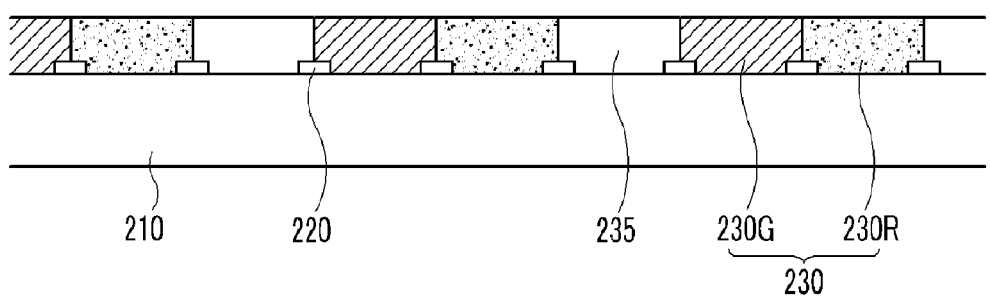
FIG. 3 to FIG. 6 sequentially show an exemplary embodiment of a method of manufacturing a common electrode display panel of the liquid crystal display shown in FIG. 1.

As shown in FIG. 3, a light blocking member 220 is formed on a substrate 210.

A light emitting element 230 is formed on the substrate 210 and the light blocking member 220.

The light emitting element 230 may include at least one of a phosphor or a quantum dot, and the light emitting element 230 may be prepared in accordance with imprinting method, such as using a stamp, inkjet printing, or screen printing. When the light emitting element 230 is prepared in accordance with imprinting method, a phosphor or a quantum dot may be coated on a rubber stamp in which the shape of the light emitting element is carved, and the solvent is evaporated to print in a desirable position.

The red and green light emitting elements 230R and 230G are arranged adjacent to each other, but a blue light emitting element is not formed. The red light emitting element 230R, the green light emitting element 230G and the position where the blue light emitting element would be formed are disposed repeatedly alternated across the substrate 210. In the illustrated embodiment, the position where the blue light emitting element would to be formed is filled with a transparent insulator 235 to compensate a height difference with respect to the red and green light emitting elements 230R and 230G, and the position excluding the blue light emitting element. However, a blue light emitting element may be formed instead of the transparent insulator 235, or the transparent insulator 235 or the blue light emitting element may not be formed in the position.

Figure 4:
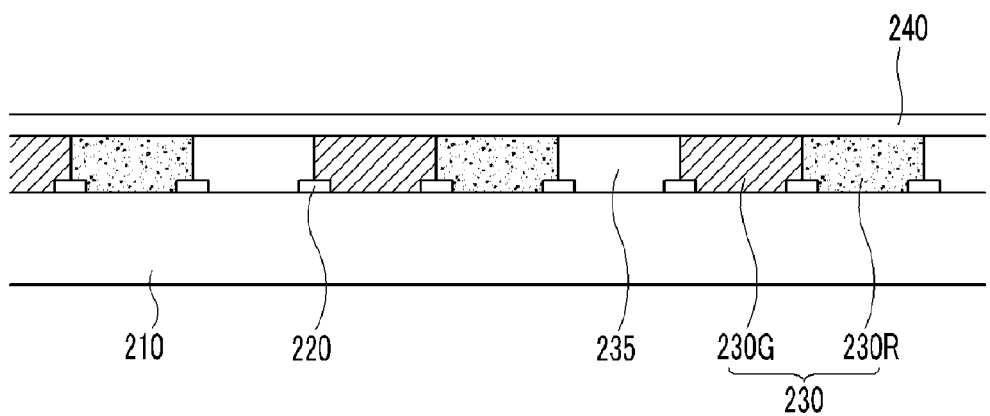

Referring to FIG. 4, an insulating layer 240 is formed on the light emitting elements 230. The insulating layer 240 may be formed overlapping an entire of the insulating substrate 210, and a whole of a lower surface of the plurality of the light emitting elements 230.

The insulating layer 240 may be formed by coating a polyimide precursor solution or a polyamic acid solution and heating the same to provide a polyimide.

The polyimide precursor or the polyamic acid may be selected from the group consisting of pyromellitic dianhydride ("PMDA"), benzophenone tetracarboxylic acid dianhydride ("BTDA"), 4,4-oxydianiline ("ODA"), benzophenone tetracarboxylic dianhydride ("BTDA"), and biphenyltetracarboxylic dianhydride-p-phenylenediamine ("BPDA"), and the polyimide precursor or the polyamic acid may be dissolved in a solvent such as dinethylacetamide ("DMAc"), dimethylformamide ("DMF"), n-butyl cellosolve, and N-methyl pyrrolidone ("NMP") to provide a solution. Subsequently, the solution is coated on the substrate 210 in accordance with the method, such as spin coating, inkjet printing, and screen printing, and is heated. The thickness of the insulating layer 240 may be controlled depending upon the solution concentration, the coating speed, and the like.

An upper surface of the insulating layer 240 is rubbed with a cloth to provide a plurality of grooves 240a elongated along one (first) direction, as shown in FIG. 2.

Figure 5:
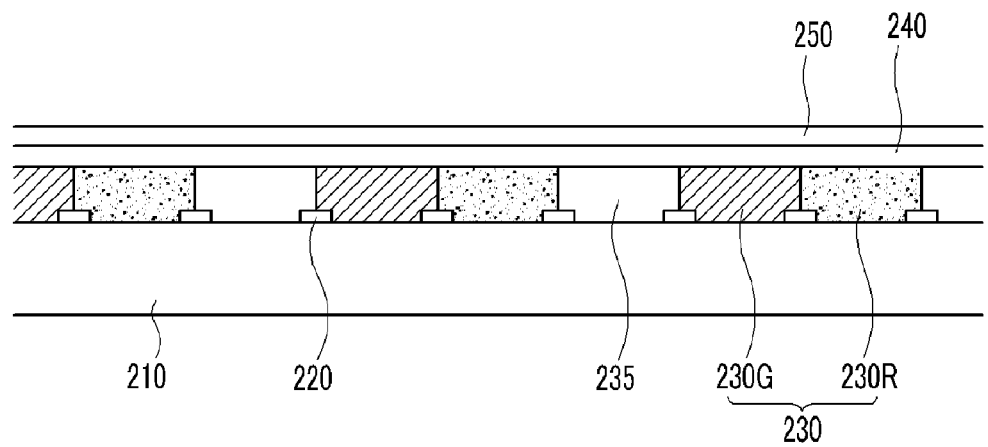

As shown in FIG. 5, a polarization layer 250 is formed on the insulating layer 240. The polarizing layer 250 may be formed overlapping an entire of the insulating substrate 210, and a whole of the light emitting elements 230. The polarization layer 250 may be prepared by coating a dichroic dye containing solution on the substrate and drying the same. Alternatively, the polarizing layer 250 may be prepared by vacuum depositing a dichroic dye.

Figure 6:
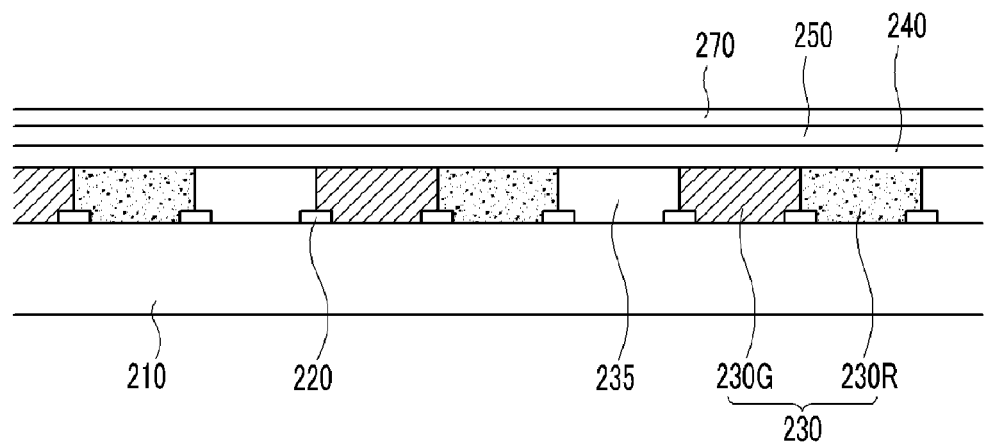

Referring to FIG. 6, ITO or IZO is deposited on the polarization layer 250 and processed by photolithography to provide a common electrode 270. The common electrode 270 may be formed overlapping an entire of the insulating substrate 210, and a whole of the light emitting elements 230.

Hereinafter, a liquid crystal display according to another embodiment is described with reference to FIG. 7.

Figure 7:
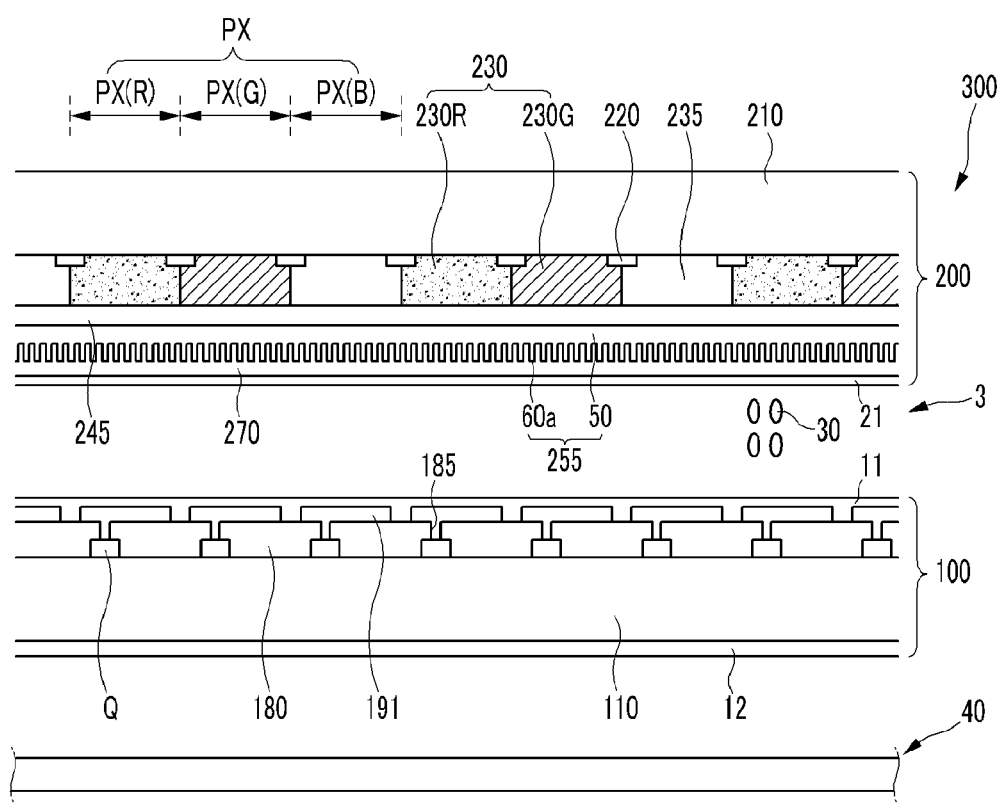
FIG. 7 is a cross-sectional view showing a liquid crystal display according to another embodiment of the present invention.

FIG. 7 is a cross-sectional view showing the liquid crystal display according to another embodiment of the present invention.

Repeated descriptions of the above-mentioned embodiment are omitted for this embodiment, and the same reference numbers as in the above-mentioned embodiment indicate the same constituent elements.

The liquid crystal display according to another embodiment of the present invention also includes a liquid crystal display panel 300 including a thin film transistor display panel 100, a common electrode display panel 200, a liquid crystal layer 3, and a light source 40 generating and supplying light to the liquid crystal display panel 300 as in the above-mentioned embodiment.

In the thin film transistor display panel 100, a thin film transistor Q is disposed on the substrate and a protective layer 180 including a contact hole 185 is disposed on the thin film transistor Q. A pixel electrode 191 is disposed on the protective layer 180. An alignment layer 11 and a polarizer 12 are respectively disposed on opposite surfaces of the thin film transistor display panel 100.

In the common electrode display panel 200, a light blocking member 220 is disposed on the substrate 210, and a plurality of light emitting elements 230 are disposed on the substrate 210. The light emitting element 230 includes a red light emitting element 230R disposed in a red pixel PX(R) and a green light emitting element 230G disposed in a green pixel PX(G), and a transparent insulator 235, instead of a blue light emitting element, disposed in the blue pixel PX(B).

An insulating layer 245 is disposed on a plurality of the light emitting elements 230. The insulating layer 245 may include an inorganic insulating material such as silicon oxide ("SiO$_2$") and silicon nitride ("SiNx"), or an organic insulating material such as polyimide and polyacryl.

A wire grid polarizer 255 is disposed on the insulating layer 245.

The wire grid polarizer 255 is described with reference to FIG. 8.

Figure 8:
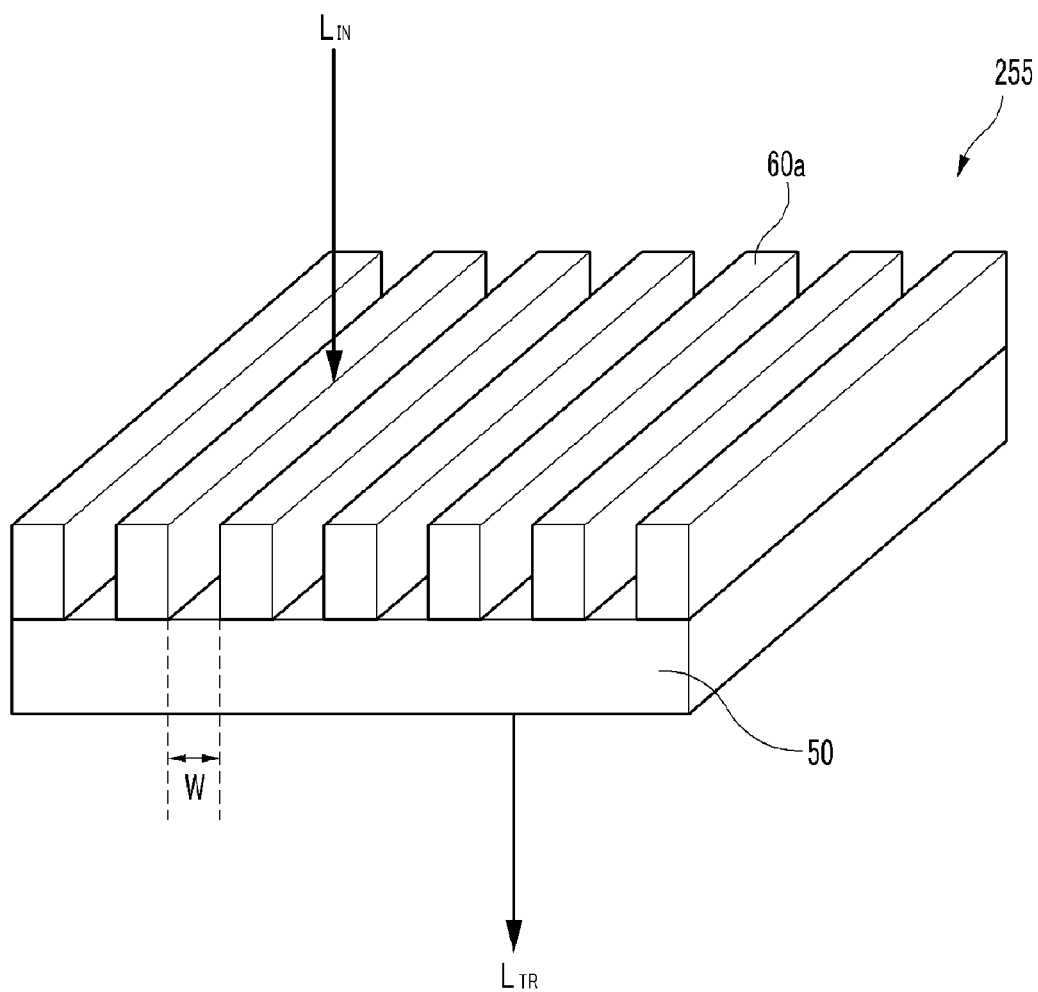
FIG. 8 is a schematic view showing an exemplary embodiment of a wire grid polarizer provided in the liquid crystal display shown in FIG. 7.

FIG. 8 is a schematic view showing an exemplary embodiment of the wire grid polarizer provided to the liquid crystal display shown in FIG. 7.

As shown in FIG. 8, the wire grid polarizer 255 includes a structure in which a plurality of metal wires 60a are each longitudinally extended along a first direction, and arranged along one (second) direction of a substrate 50. The substrate 50 is a substantially planar member including an upper surface, and a lower surface from which the plurality of metal wires 60a are protruded. When incident light ($L_{IN}$) is transmitted through the wire grid polarizer 255, the parallel component of the incident light ($L_{IN}$) to the metal wires 60a may be absorbed or reflected, and the perpendicular component of the incident light ($L_{IN}$) may be polarized into transmission light ($L_{TR}$).

When the incident light ($L_{IN}$) has a longer wavelength than an interval W taken along the second direction between adjacent metal wires 60a, it is possible to accomplish effective polarization. Each of the metal wire 60a may be include a metal such as aluminum (Al), silver (Ag), gold (Au), copper (Cu), and nickel (Ni). The metal wire 60a may be formed in accordance with a method such as a nano-imprinting to finely adjust the interval W between the metal wires 60a.

The wire grid polarizer 255 may be separately prepared and attached on the insulating layer 245, or the wire grid polarizer 255 may be manufactured directly on the insulating layer 245. As illustrated in FIG. 7, the substrate 50 and the wires 60 may collective form a unitary indivisible and continuous member of the wire grid polarizer 255.

A common electrode 270 is disposed on an incident surface of the wire grid polarizer 255, and an alignment layer 21 is disposed on the common electrode 270. Portions of the common electrode 270 are disposed between adjacent wires 60a in the interval W. The wires 60a alternate with the portions of the common electrode 270 in the second direction of the wire grid polarizer 255. As illustrated in FIG. 7, the common electrode 270, including the portions disposed between adjacent wires 60a, is a unitary indivisible and continuous member.

In the illustrated embodiment, the substrate 210 and the alignment layer 21 respectively define the uppermost and lowermost element of the common electrode display panel 200, as illustrated in FIG. 7. Since the wire grid polarizer 255 is disposed within the common electrode display panel 200, and is not disposed on an outer surface of the common electrode display panel 200 to form an outermost member of the display panel, the overall thickness of the liquid crystal display is reduced.

A method of manufacturing the wire grid polarizer is described with reference to FIG. 9A to FIG. 9F.

FIG. 9A to FIG. 9F are cross-sectional views subsequently showing an exemplary embodiment of a method of manufacturing the wire grid polarizer shown in FIG. 8.

Figure 9A:
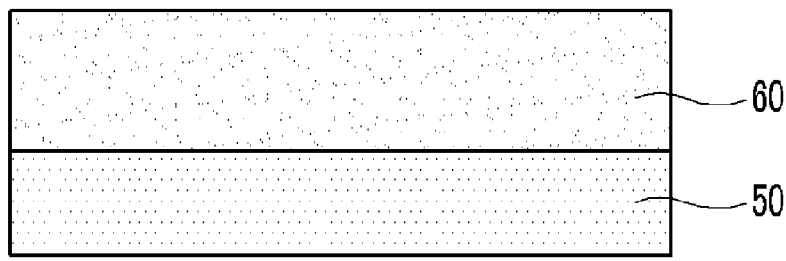
FIG. 9A to FIG. 9F are cross-sectional views sequentially showing an exemplary embodiment of a method of manufacturing the wire grid polarizer shown in FIG. 8.

As shown in FIG. 9A, a metal layer 60 including of aluminum (Al), as an example, is formed on a substrate 50 including glass, plastic, or silicon, for example.

Figure 9B:
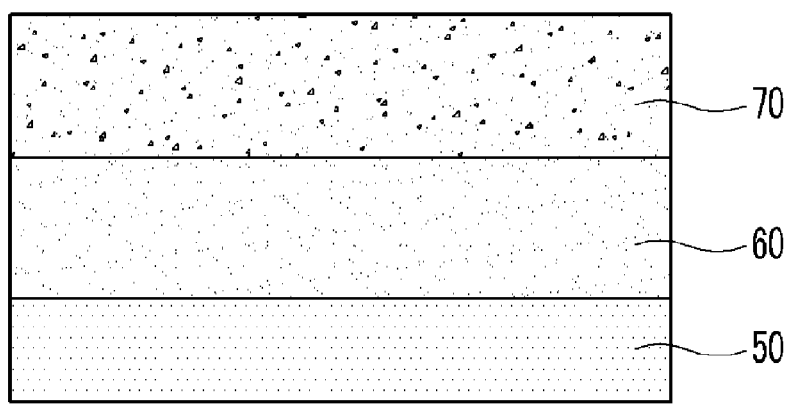

Referring to FIG. 9B, a resin for imprinting 70 is coated on the metal layer 60, such as by spin coating.

Figure 9C:
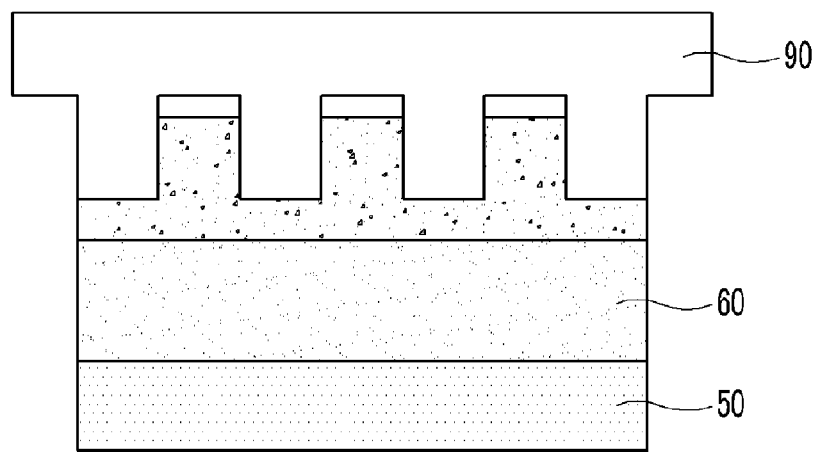

As shown in FIG. 9C, a stamp 90 including of silicon (Si), for example, is disposed on the resin for imprinting 70, and the resin for imprinting 70 is imprinted. The stamp 90 includes a plurality of recess portions and a plurality of convex (e.g., protruding) portions considering the shape of the metal wires to be finally formed. In an exemplary embodiment, the metal wires may be formed in a fine width of about 100 nanometers (nm) or less, taken in the second direction of the wire grid polarizer 255. Such fine parts may be formed in accordance with laser interference lithography or reactive ion etching.

Figure 9D:
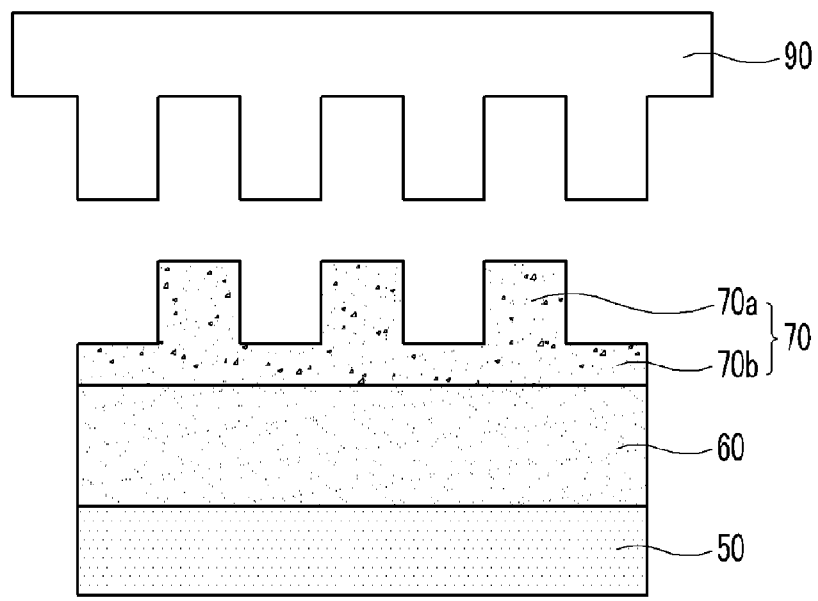

As shown in FIG. 9D, when the stamp 90 is removed from the resin for imprinting 70, the resin for imprinting 70 is formed with a predetermined pattern including a (first) thick part 70a and a (second) thin part 70b. The relative "thickness" and "thinness" are taken in a direction substantially perpendicular to the substrate 50, such as in a third direction orthogonal to the first and second directions of the wire grid polarizer 50.

Figure 9E:
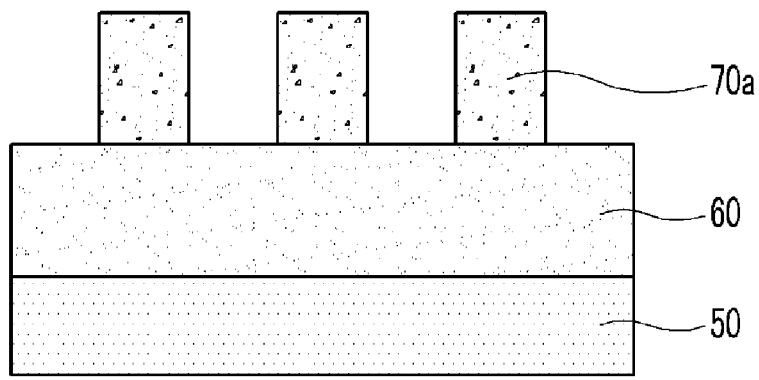

As shown in FIG. 9E, a thin part 70b of the resin for imprinting 70 is removed, in accordance with a method such as reactive ion etching, and a thick part 70a remains on the metal layer 60. The thick part 70a of the resin for imprinting 70 effectively acts as a mask to etch the metal layer 60.

Figure 9F:
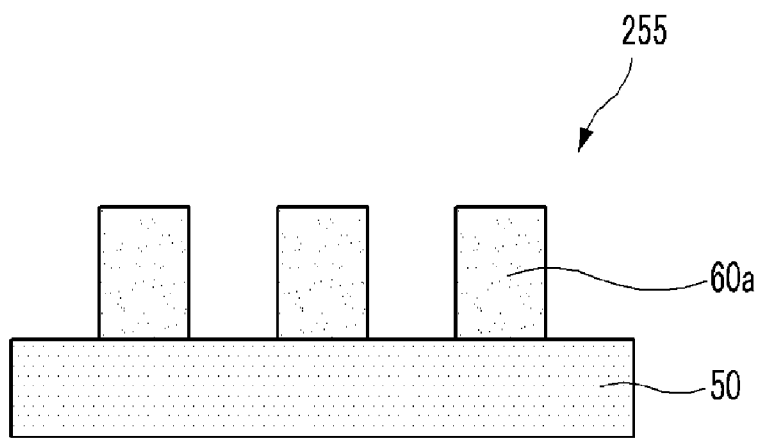

With the thick part 70a serving as a mask, the thick part 70a and portions of the metal layer 60 not overlapped by the thick part 70a, are removed. Accordingly, the removing of the thick part 70a and the portions of the metal layer 60 provides a final wire grid polarizer 255, in which a plurality of metal wires 60a are arranged in a predetermined interval on the substrate 50, as shown in FIG. 9F.

Hereinafter, examples of the present invention are illustrated in more detail. However, these subsequently described embodiments are exemplary examples of the present invention and the present invention is not limited thereto.

Example 1

A negative photosensitive layer is formed on a glass substrate at a thickness of about 2 micrometers (μm) to about 4 μm, and exposed with light of a wavelength region of about 350 nm to about 440 nm by using a mask including a predetermined pattern. The exposed negative photosensitive layer formed on the glass substrate is subjected to a post-exposure baking process at a temperature of about 110° C. for about 90 seconds. The photosensitive layer is developed in a 2.38% TMAH solution to provide a black matrix.

A red phosphor solution containing $Y_2O_2S$:Eu and a green phosphor solution containing $BaMgAl_{10}O_{17}$:Eu,Mn are individually prepared. The red phosphor solution is coated on a surface of a rubber stamp, and the solvent is evaporated. The rubber stamp is printed on the substrate to provide a red phosphor. Subsequently, the green phosphor solution is coated on a surface of another rubber stamp, the solvent is evaporated, and the resulting green phosphor solution is printed on the substrate to provide a green phosphor.

A polyamic acid diethyl ester of biphenyltetracarboxylic dianhydride-p-phenylenediamine ("BPDA") having a molecular weight of about 30,000 is dissolved in N-methylpyrrolidone ("NMP") and coated on the substrate by spin coating. The spin coating is performed in an oven of about 300° C. under an atmosphere of nitrogen ($N_2$) and a speed of about 1 degree Celsius per hour (° C./h). The substrate is allowed to stand under the atmosphere at about 300° C. for about 1 hour and cooled to room temperature at a speed of about 1° C./h to provide a polyimide layer. The surface of polyimide layer is rubbed with a nylon cloth.

Copper phthalocyanine is deposited on the rubbed polyimide layer at a pressured of about $1.3 \times 10^{-3}$ pascal (Pa) to provide a polarization layer. The depositing speed is about 0.04 to about 0.06 nanometers per second (nm/s), and the thickness of the deposited copper phthalocyanine is about 80 nm.

An ITO target is provided on the sputtering source, and ITO is deposited on the polarization layer by sputtering under an argon (Ar) atmosphere. The distance between the substrate and the target is set at about 11 centimeters (cm), and the sputtering pressure is set at about $2.5 \times 10^{-3}$ Torr.

Example 2

The next exemplary embodiment is carried out in accordance with the same procedure as in Example 1, except that the insulator is prepared by diluting SE7492K (manufactured by Nissan Chemical Korea Co. Ltd.) forming about 6% of polyimide in a N-methylpyrrolidone solvent, spin-coating at about 3000 revolutions per minute (rpm) for about 30 seconds, allowing the same to stand at about 300° C. for about 1 hour, and cooling and rubbing the same.

Example 3

The next exemplary embodiment is carried out in accordance with the same procedure as in Example 2, except that the insulator is prepared by spin-coating PI-B (manufactured by Nissan Chemical Co. Ltd.), prebaking the same at about 80° C. for about 15 minutes, allowing the same to stand at about 250° C. for about 1 hour, and cooling the same.

Example 4

The next exemplary embodiment is carried out in accordance with the same procedure as in Example 3, except that the insulator is prepared by spin-coating DuPont 2555 (manufactured by DuPont Co. Ltd.), prebaking at about 100° C. for about 90 seconds, and hardbaking at about 250° C. for about 60 minutes. The insulator is subsequently rubbed with a velvet cloth about 10 times.

Example 5

The next exemplary embodiment is carried out in accordance with the same procedure as in Example 4, except that the insulator is prepared by coating a polyimide solution (manufactured by Hitachi Chemical Company Ltd.) at about 80 nm by screen printing, and rubbing the same with a nylon cloth.

Example 6

The next exemplary embodiment is carried out in accordance with the same procedure as in Example 5, except that the insulator is prepared by coating SUNEVER (manufactured by Nissan Chemical Co. Ltd.).

Even though the polarization layer is described to be disposed on the common electrode display panel in the above described exemplary embodiments, the invention is not limited thereto. Alternatively, the polarization layer may be disposed on the thin film transistor display panel, or on both the common electrode display panel and the thin film transistor display panel. The polarizer attached to the outside of thin film transistor display panel may be omitted.

In the above illustrated exemplary embodiments, while only the liquid crystal display on which the light emitting element is disposed in the common electrode display panel is described, the invention is not limited thereto, and the invention may be equally applicable to other displays and structures in which the light emitting element is disposed in a thin film transistor display panel.

In the above described exemplary embodiments, while only a twist-nematic liquid crystal display ("TN-LCD") is described, the invention is not limited thereto, and the invention may be equally applicable to all kinds of liquid crystal displays, such as a vertical aligned liquid crystal display ("VA-LCD") or an in-plane switching liquid crystal display ("IPS-LCD").

Since a polarization layer is disposed inside of a display panel and has a relatively small thickness of about 1 μm or less, it is possible to decrease an overall thickness of the liquid crystal display.

While this invention has been described in connection with exemplary embodiments, it is to be understood that the invention is not limited to the disclosed embodiments, but, on the contrary, the invention intended to cover various modifications and equivalent arrangements included within the spirit and scope of the appended claims.

What is claimed is:

1. A liquid crystal display comprising:
   a first display panel comprising a plurality of pixel electrodes;
   a second display panel facing the first display panel; and
   a liquid crystal layer interposed between the first display panel and the second display panel,
   wherein the second display panel comprises:
      a light emitting element displaying a color;
      an insulating layer disposed on the light emitting element and including a plurality of grooves;
      a polarization layer which contacts the insulating layer along a length of the grooves, and is opposite to the light emitting element with respect to the insulating layer; and
      a common electrode disposed on the polarization layer, facing the pixel electrode; wherein the polarization layer comprises a dichroic dye absorbing light of a visible ray region; wherein the grooves are each elongated in one direction, and the dichroic dye is filled in the grooves.

2. The liquid crystal display of claim 1, wherein the polarization layer has a thickness of about 0.05 micrometer to about 1 micrometer.

3. The liquid crystal display of claim 1, wherein the light emitting element comprises at least one of a phosphor and a quantum dot.

4. The liquid crystal display of claim 1, further comprising a light emitting diode supplying light to the light emitting element.

5. The liquid crystal display of claim 4, wherein the light emitting element emits light having a longer wavelength than a wavelength supplied from the light emitting diode.

6. The liquid crystal display of claim 5, wherein the light emitting diode emits blue light, and the light emitting element emits at least one of red light and green light.

7. The liquid crystal display of claim 6, wherein the light emitting element does not emit blue light.

8. The liquid crystal display of claim 6, wherein the light emitting element comprises a red light emitting element, a green light emitting element and a transparent element repeatedly alternated in the second display panel, the transparent element transmitting the blue light emitted from the light emitting diode.

* * * * *